United States Patent [19]
Onoyama et al.

[11] Patent Number: 4,647,511
[45] Date of Patent: Mar. 3, 1987

[54] FLAKE LIKE METAL CHIPS, A METHOD OF AND AN APPARATUS FOR MAKING THE SAME

[75] Inventors: Takashi Onoyama, Yokohama; Hiroshi Makino, Kawasaki, both of Japan

[73] Assignee: Nippon Yakin Kogyo Co., Ltd., Tokyo, Japan

[21] Appl. No.: 716,486

[22] Filed: Mar. 27, 1985

[30] Foreign Application Priority Data

Mar. 28, 1984 [JP] Japan .................................. 59-60384
Jul. 19, 1984 [JP] Japan ................................ 59-150272

[51] Int. Cl.4 ............................................. C04B 31/18
[52] U.S. Cl. .................................... 428/599; 428/603; 75/251
[58] Field of Search .................. 264/8; 425/8; 75/251; 106/97; 164/423, 429, 463, 479; 428/599, 603

[56] References Cited

U.S. PATENT DOCUMENTS

| | | | |
|---|---|---|---|
| 3,838,185 | 9/1974 | Maringer et al. | 264/8 |
| 3,857,703 | 12/1974 | McGriffin | 75/251 |
| 3,908,745 | 9/1975 | Caldwell et al. | 164/479 |
| 3,964,963 | 6/1976 | Anderson | 164/479 |
| 4,154,284 | 5/1979 | Maringer | 264/8 |
| 4,212,343 | 6/1980 | Narasimban | 164/423 |
| 4,290,993 | 9/1981 | Maringen | 264/8 |
| 4,385,013 | 5/1983 | Couling et al. | 264/8 |
| 4,552,199 | 11/1985 | Onoyama et al. | 164/423 |

FOREIGN PATENT DOCUMENTS

| | | | |
|---|---|---|---|
| 154272 | 11/1981 | Japan | 164/423 |
| 55154 | 4/1983 | Japan | 164/429 |
| 7315 | 8/1909 | United Kingdom | 264/8 |

Primary Examiner—L. Dewayne Rutledge
Assistant Examiner—John J. Zimmermann
Attorney, Agent, or Firm—Basile, Weintraub, Hanlon

[57] ABSTRACT

Produced flake like metal chip has a shape being convexed in one side and concaved in the other side in its cross section.

These metal chips are produced by dipping spherical or cone shaped projections provided on an outer surface of a rotary drum into molten metal contained in a molten metal reservoir, the molten metal adheres to each projections being dipped then the adhered molten metal is stripped off of each projection after at least a part of the molten metal has solidified.

The apparatus for working the above-mentioned method includes, a molten metal reservoir, a rotary drum carrying on its outer surface a number of aforesaid projections, to the tip end of which the molten metal is adhered, and a means for stripping off the adhered molten metal after at least a part of the adhered molten metal has solidified.

2 Claims, 13 Drawing Figures

FLAKE LIKE METAL CHIPS, A METHOD OF AND AN APPARATUS FOR MAKING THE SAME

BACKGROUND OF THE INVENTION

1. Field of the Invention:

This invention relates to flake like metal chips or particles for use in strengthening the surface zone of a laid concrete floor by embedding such chips and to a method of and an apparatus for producing the same. More particularly, this invention relates to a method of making such chips of comparatively small size (for instance, 3.0 mm or less) by a simplified manner and by using an apparatus of simplified construction also in mass production.

2. Prior Art:

Since a laid concrete floor itself is generally soft and low in hardness, it is liable to be worn due to abrasion not only by articles of high hardness but also by such soft articles as those made of wood.

By taking these situations into consideration, the laying of concrete in modern construction adopts a way of improving wear resistant property and of preventing cracks from occurring on the surface of the concrete by embedding or scattering metal particles in the surface layer of the concrete floor.

Such metal particles as have heretofore been used for reinforcing concrete floors were supplied in the form of finely crushed machine tools chips or as cut chips obtained in making nails. Due to these facts, there have been many problems of not only a poor production efficiency but also poor uniformity in size and shape, thereby rendered uniform embedding of these particles in concrete floor very difficult.

As a prior art that the inventor of this invention recognises, there are such a method of and an apparatus for forming flake particles as disclosed by Japanese Laid-Open Patent Publication Sho-54(1979)-40262. The method of forming the flake particles comprises the steps of:

(a) rotating a heat-extracting drum which is provided around its peripheral rim with a plurality of tapered serrations;

(b) advancing the serrations formed on the drum onto the surface of molten material to form a number of independent flake particles, then letting said particles partially solidify on said serrations by extracting heat from said serrations;

(c) releasing the particles from the serrations; and (d) cooling the thus released particles in a surrounding air.

However, the particles obtained by the above method are formed as mere flat flakes, so they are not relevant to the main object of the present invention.

THE OBJECT OF THE INVENTION

The present invention aims to solve the problems as mentioned above, for this purpose, it aims to provide flake-like metal chips each having a convex front face and a concave rear face in its cross section, and also to obtain such metal chips having uniformity both in their shape and size in mass production.

SUMMARY OF THE INVENTION

The present invention relates to flake-like metal chips themselves each having a convex face at one side and a concave face at its the other side. The present invention also provides a method of producing flake-like metal chips comprising the steps of: (a) advancing and dipping inverted cup-shaped projections provided on the outer periphery of a rotary drum into the molten metal contained in a molten metal reservoir so that a part of the molten metal can adhere to the tip end of the projection; and (b) releasing the thus adhered molten metal from the projection after the adhered molten metal has partially solidified. For carrying out the method as mentioned, the present invention further provides an apparatus for producing flake-like metal chips which comprises, a molten metal reservoir for receiving molten metal therein, rotary drum having a plurality of projections of inverted cup-like configuration around its outer periphery to the surface of which the molten metal is adhered, and a means for stripping the thus adhered molten metal from the projections after the adhered molten metal has partially solidified.

BRIEF DESCRIPTION OF THE DRAWINGS

FIGS. 11(a)–(c) show metal chip of conical shape, among which FIG. 11(a) is a perspective view showing bottom side of the chip, FIG. 11(b) is a perspective view showing side faces of the chip and FIG. 11(c) is a sectional side view.

DETAILED DESCRIPTION OF THE PREFERRED EMBODIMENTS

Example 1

FIGS. 1–6 are drawings showing an example of the present invention.

Explanation will now be made, at first, on the construction.

Figure 1:
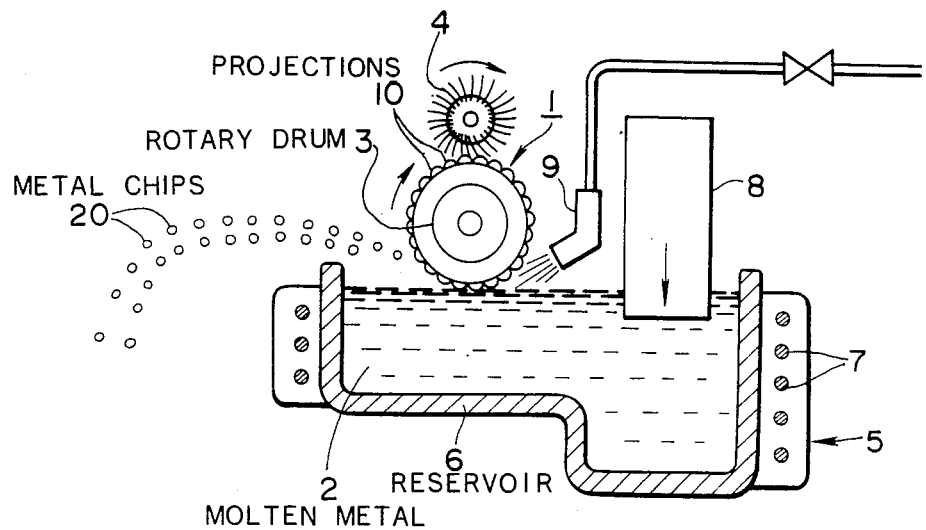
FIG. 1 is a schematical drawing showing an apparatus according to one example of the present invention.
Figure 2:
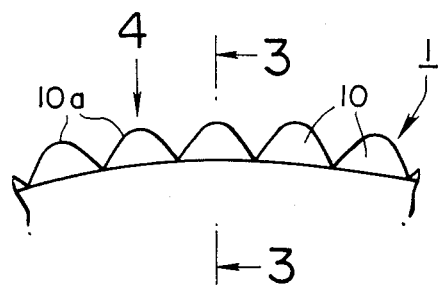
FIG. 2 is a front view showing the shape of the major part of a rotary drum of the invention.
Figure 3:
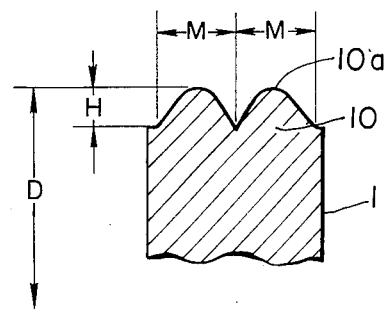
FIG. 3 is a sectional view taken along line 3—3 of FIG. 2.
Figure 4:
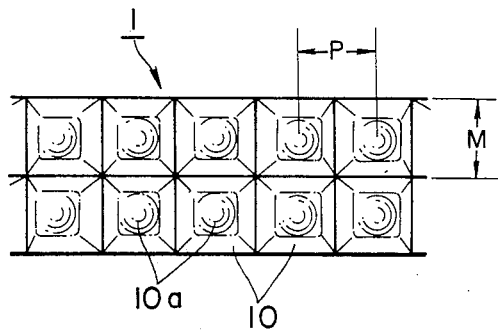
FIG. 4 is a plan view seen from arrow line 4 of FIG. 2.

In FIG. 1, numeral 1 is a rotary drum of circular shape, the radially outer surface of which is provided with a large number of projections 10, as shown being enlarged in FIGS. 2–5, which project radially outwardly from the outer peripheral surface.

These projections 10 are arranged as a set consisting of two rows constituting two rings. Each of the projections 10 is crowned with a tip end portion 10a of an inverted cup-like configuration onto which suitable amount of molten metal 2 adheres.

Such a rotary drum 1 can be made of suitable material having high thermal conductivity such as pure copper, copper alloys (for example 0.2% Zr-Cu, 9% Cr-Cu and so on), thereby promoting solidification of the molten metal adhered to the tip end portion 10a by fast heat extraction.

Numeral 3 in FIG. 1 is a driving means for rotating aforesaid rotary drum 1 composed, for example, of an electric motor, transmission means and so forth and is coupled to the rotary shaft of the rotary drum 1. This driving means 3 is a substantial example of a stripping means for stripping the adhered molten metal off from the projection 10 by imparting centrifugal force. To this end, rotating speed of the rotary drum 1 is set at such a rate that the molten metal 2 adhered to the projections 10 provided on the outer surface can be stripped off from the tip end portion 10a to form discrete chips by a centrifugal force imparted through the rotary drum 1, after at least a part of the adhered molten metal has solidified.

Moreover, the rotary drum 1 is constructed so as to be raised or lowered in vertical direction by any suitable lifting means (not shown) and is positioned above the level of the molten metal when it is not used, while it is lowered in operation such that the tip end 10a of the lowermost projections 10 can be dipped into the molten metal 2. The molten metal 10 is received in a molten metal reservoir 6 of a melting means 5. As metal particles to be used, various materials such as cast steel, plain carbon steel, stainless steel, aluminum alloys, lead and so on can be used as suitable starting material.

The melting means 5 is composed of a molten metal reservoir 6 made of refractory material such as graphite, alumina or the like and a heating element 7 wound around the reservoir 6. The heating element 7 heats the reservoir 6 to maintain the molten metal 2 received therein normally at a pre-determined temperature.

In FIG. 1, there is a wiper 4 being used as another example of the stripping means, which is disposed to wipe off any metal chip still remaining being adhered to the tip end 10a without having been stripped off even by the centrifugal force explained above. Moreover, a level block 8 can also be provided for adjusting the level of the molten metal 2. The level block 8 is made of a refractory material such as bricks and can be moved up and down depend upon the yield rate of the metal chips 20 so that the level can be maintained at a desired height. Numeral 9 in the drawing is a heating means for heating both the lower side of the rotary drum 1 and the portion of the molten metal 2 into which the lower side of the rotary drum is dipped, thereby prevents undesired cooling of the molten metal from occurring due to the surrounding atmosphere.

Next, explanation will be made on the operation of the invention.

At first, a suitable amount of molten metal 2 is stored in the molten metal reservoir 6 of the melting means 5. For example, molten metal such as stainless steel melted in a melting furnace (not shown) is poured into a molten metal reservoir 6 being heated by the heating element 7, thereby keeping the molten metal 2 at a desired temperature. At the same time, in order to prevent the air sucked by the rotary drum 1 and blown to the surface of the molten metal 2 from causing temperature drop of the molten metal 2, surface of the molten metal 2 is kept at sufficiently high temperature by the heating means 9. Temperature control of the molten metal 2 is automatically performed by using a suitable temperature control means (not shown).

Figure 5:
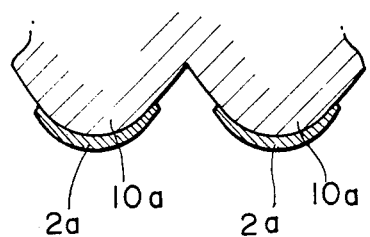
FIG. 5 is a diagrammatic sectional view showing the state where a some amount of molten metal has adhered to the tip end of the projections of the rotary drum.

From this condition, the driving means 3 is started to rotate the driving means 1 at high speed. The rotary drum 1 is lowered by operating the lifting means for dipping the tip end 10a of the projection 10, coming at the lower side of the rotary drum 1, into the molten metal 2. Then the molten metal 2 will adhere as shown in FIG. 5 to the tip end 10a of the projections 10, as the result, a pre-determined amount of molten metal 2 depending upon the extent of dipping is taken up and rotated together with each projection 10.

Then, each of the droplets 2a adhered to the tip end 10a will begin to solidify with its heat being extracted either by the rotary drum 1 alone having high thermal conductivity or, in addition, by the surrounding atmosphere. The moment a part of the molten droplet starts to solidify, each droplet is stripped and made to fly off from the tip end 10a and then scattered into the atmosphere.

Figure 6:
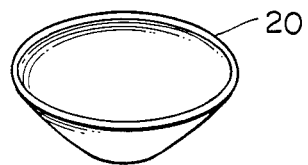
FIG. 6 is a perspective view showing a flake like metal chip obtained by the present invention.
Figure 7:
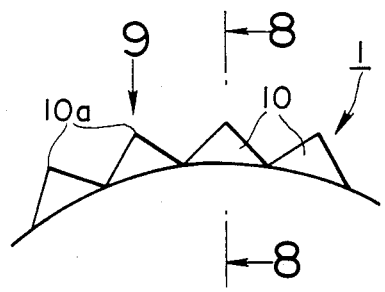
FIG. 7 is a front view showing the shape of the major part of the rotary drum to be used when it is required to produce conical metal chips.
Figure 8:
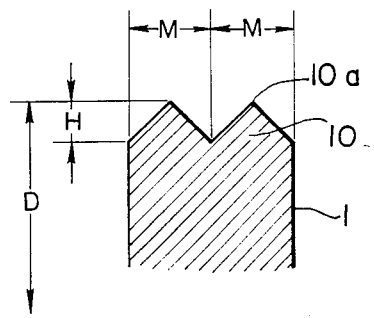
FIG. 8 is a sectional view taken along line 8—8 of FIG. 7.
Figure 9:
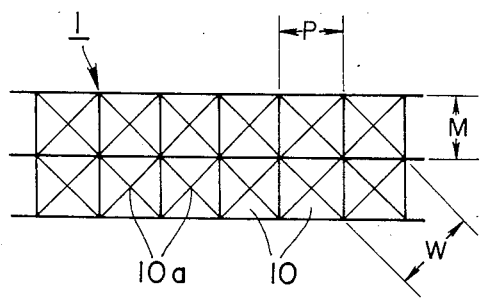
FIG. 9 is a view seen from arrow line 9.

Since the droplet 2a has at least partially solidified at the time when it is stripped off, it can be allowed to solidify without being substantially deformed during its flight under sufficient cooling effected by the surrounding atmosphere. Accordingly, flake-like metal chips 20 of almost hemispherical shape having its one side convex, while the other side concave in their cross section, as shown in FIGS. 5 and 6, can be obtained by the present invention.

Some metal chips 20 which have not been stripped off from the tip end 10a even by the imparted centrifugal force, can be wiped off from the tip end portion 10a by means of the wiper 4. Accordingly, by using centrifugal force imparted by the driving means 3 combined with the wiper means 4, all the formed metal chips 20 can be exactly stripped off from the rotary drum 1.

Here, explanation will be made on the working examples carried out according to the present invention.

Table 1 shows the kind of material and the dimension of the rotary drum 1. The Table 2 shows the results of the operation.

TABLE 1

| Material | Pure Copper | Pure copper |
| --- | --- | --- |
| Drum Diameter (D) | 310 mm | 200 mm |
| Number of Rings of Projection | 2 | 5 |
| Width of the Base of the Projection 10 (M) | 4.0 mm | 4.0 mm |
| Height of the Projection 10 (H) | 2.5 mm | 2.5 mm |
| Pitch of the Projection 10 (P) | 4.0 mm | 4.0 mm |
| Number of Projection 10 | 243/ring | 157/ring |

TABLE 2

| Molten Metal | Stainless Steel AISI 430 (18Cr—Fe) | Cast Iron 3C—4Si—Fe |
| --- | --- | --- |
| Atmosphere | Air | Air |
| Heating Temperature | 1540–1580° C. | 1350–1380° C. |
| Number of Rotation of the Rotary Drum | 250 rpm | 360 rpm |
| Peripheral Speed of the Rotary Drum | 4.1 m/sec | 3.8 m/sec |
| Heating Means | Propane Flame | Propane Flame |
| Material of Wiper | Stainless Steel Wire | Stainless Steel Wire |
| Peripheral Speed of Wiper | 2.1 m/sec | 2.4 m/sec |

Through this working example, obtained metal chips included both hemispherical metal chips 20 as shown in FIGS. 5 and 6 having a diameter of 1.0–2.0 mm and somewhat deformed oval or similar shape ones within permissible range. Among the obtained metal chips, the portion of the largest wall thickness of each chip varied 0.19–0.27 mm, while their weight per each piece was 1.0–1.5 mg and the yield rate per one hour was proved to be 8 Kg.

As can be seen from the aforesaid working examples, large number of flake-like metal chips 20 of cup-like or similar shape were produced in continuous manner directly from molten metal 2 by using an apparatus of very simple construction.

The flake-like metal chips 20 thus produced can be used, for example, as reinforcing material for building floors either by embedding in the surface layer of the concrete floors or by scattering therein. This improves wear resistance and increases the strength of the floor itself and prevents cracks from occurring. The metal chips 20 obtained by the present invention are almost circular in their flat position and have no pointed sharp edges, so there is no fear that any sharp edge or point projects above the laid floor surface, so they can be used for making concrete building of high safety. Especially, by making the metal chips 20 by using stainless steel, formation of any rust on the metal chips can be entirely prevented. Consequently, remarkable advantage can be expected for the floors or the passages of the buildings such as refrigerated warehouses or perishable foods warehouses where good appearance is required and yet normally being highly damped.

In this example, droplets 2a of the molten metal 2 were allowed to fly in the air so as to be cooled thereby, however, the apparatus can be constructed in such a different way, that the droplets are made to fly in an inert gas such as argon gas, wherein the droplet is cooled by the inert gas atmosphere.

It goes without saying that the number of rows, namely, the number of rings and the number of projections per each ring shall not be limited to that shown in those examples, but they can be suitably selected when occasion demands. Alternately, a large number of hemispheres can be formed to constitute protrusions for forming metal chips.

FIGS. 7–11 show other working examples for forming metal chips of pyramidal or cone shaped ones. Each projection 10 is formed as a cone-shaped unit, to the tip end of which a desired amount of molten metal 2 is adhered. A rotary drum 1 having such projections is made of a material having comparatively high thermal conductivity such as pure copper, copper alloys (e.g. 0.2% Zr-99.8% Cu, 0.9% Cr-99.1% Cu or the like), thereby extract heat in the molten metal 2 adhered to the tip end 10a of the projections 10 so as to promote faster solidification of the adhered metal.

The metal chips obtained by the method of this example take a configuration having a convex conical front portion and a convex conical rear portion. For this purpose the projections 10 differ from those of the previous example in that they are formed as cone-shaped units. The remaining portion of the drum is the same as that of the previous working example.

Figure 10:
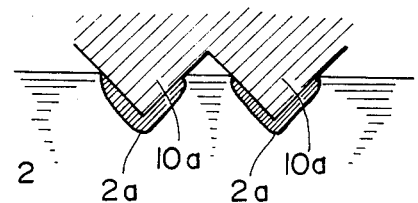
FIG. 10 is a diagrammatical view showing the tip end of the rotary drum with its projections being adhered with molten metal.

The driving means 3 is rotated for rotating the rotary drum 1 at high speed. The rotary drum 1 is, then, lowered by operating the lifting means. Thus, the tip end 10a of the projection 10 coming at the lower end of the rotary drum 1 is dipped into the molten metal 2. Molten metal 2 will adhere to the tip end 10a of cone shaped projection 10 as shown in FIG. 10, as the result, a certain amount of molten metal determined by the extent of dipping is taken up by each projection and is rotated together with the projection 10.

The heat of droplet 2a of the molten metal 2 which has adhered to any of the tip end 10a is extracted by the drum 1 of high thermal conductivity, or additionally by the surrounding atmosphere and begins to solidify.

Upon starting of such partial solidification of the droplets 2a, the droplets will be swung away from the tip end 10a by centrifugal force imparted by the rotary drum 1 and scattered into the atmosphere.

The droplets 2a, which are at least partly solidified when they left the tip end 10a, are fully cooled by the atmosphere during their flight to solidify without being materially deformed in their shape. By virtue of these conditions, metal chips 20 having convex front faces and concave rear faces in cross section as shown in FIGS. 11(a)–(c) can be obtained.

Some of the metal chips 20 which remained on the tip end 10a without being stripped off by the centrifugal force are wiped away by the wiper 4. Accordingly, by the combined use of the wiper 4 in addition to the centrifugal force imparted by the driving means 3, all the adhered metal chips 20 can be completely stripped off from the rotary drum 1 entirely in the same manner as mentioned in the previous example.

The material selected and the dimension of the shaped drum 1 used for this example are shown in Table 3, while Table 4 shows the result of the test.

Figure 11A:
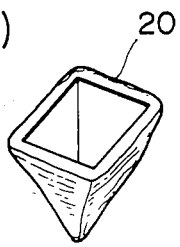
Figure 11B:
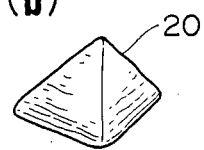
Figure 11C:
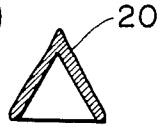

Through these working tests, cone shaped metal chips 20 as shown in FIGS. 11(a)–(c) having diagonal length W ranging 1.0–5.0 mm and other similar cones were obtained. The size of the obtained metal chips at the largest wall thickness portion were 0.10–0.40 mm and the weight per each chip varied in a range of 1.0–10.0 mg. Yield rate per hour per each ring of projections was 5 kg–20 kg.

As can be apparent from these examples, cone shaped metal chips 20 were continuously produced in large amounts directly from molten metal 2 by using an apparatus of very simple construction.

TABLE 3

| Material | Pure Copper | Chromium Copper |
| --- | --- | --- |
| Drum Diameter (D) | 310 mm | 250 mm |
| Number of Rings of Projection | 2 | 40 |
| Width of the Base of the Projection 10 (M) | 4.0 mm | 5.0 mm |
| Height of the Projection 10 (H) | 2.5 mm | 6.0 mm |
| Pitch of the Projection 10 (P) | 4.0 mm | 10.0 mm |
| Number of Projection 10 | 243/ring | 78/ring |

TABLE 4

| Molten Metal | Stainless Steel AISI 430 (18Cr—Fe) | Cast Iron 3C—4Si—Fe |
| --- | --- | --- |
| Atmosphere | Air | Air |
| Heating Temperature | 1540–1580° C. | 1340–1370° C. |
| Number of Rotation of the Rotary Drum | 250 rpm | 360 rpm |
| Peripheral Speed of the Rotary Drum | 4.1 m/sec | 2.6 m/sec |
| Heating Means | Propane Flame | Propane Flame |
| Material of Wiper | Stainless Steel Wire | Stainless Steel Wire |
| Peripheral Speed of | 2.1 m/sec | 2.4 m/sec |

TABLE 4-continued

| Molten Metal | Stainless Steel AISI 430 (18Cr—Fe) | Cast Iron 3C—4Si—Fe |
|---|---|---|
| Wiper | | |

I claim:

1. A flake-like metal chip having in cross section a concave face or faces at one side and a convex face or faces at the other side, the shape of which, in flat view, is substantially circular.

2. A flake-like metal chip having in cross section a concave face or faces at one side and a convex face or faces at the other side, the shape of which is a cone-shaped configuration.

* * * * *